Oct. 11, 1966  NOBUO NAKAHARA  3,277,520
METHOD AND APPARATUS FOR MAKING SPHERICAL GRANULES
Filed June 17, 1964  3 Sheets-Sheet 1

INVENTOR
NOBUO NAKAHARA
BY
Mason, Fenwick & Lawrence
ATTORNEYS

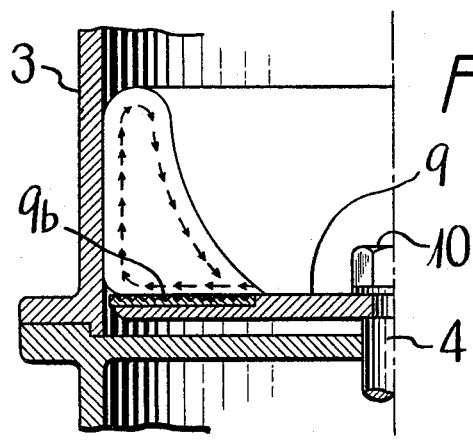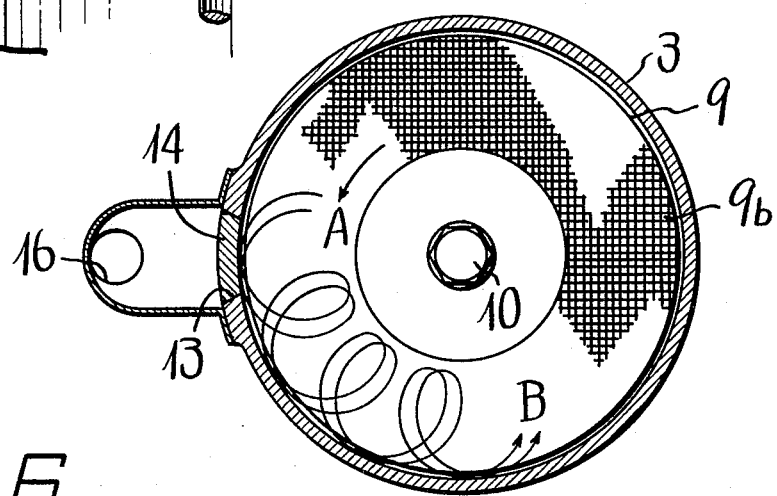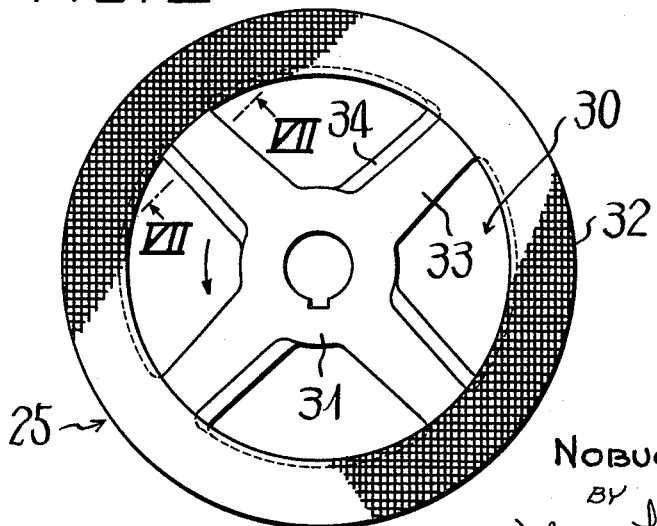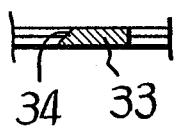

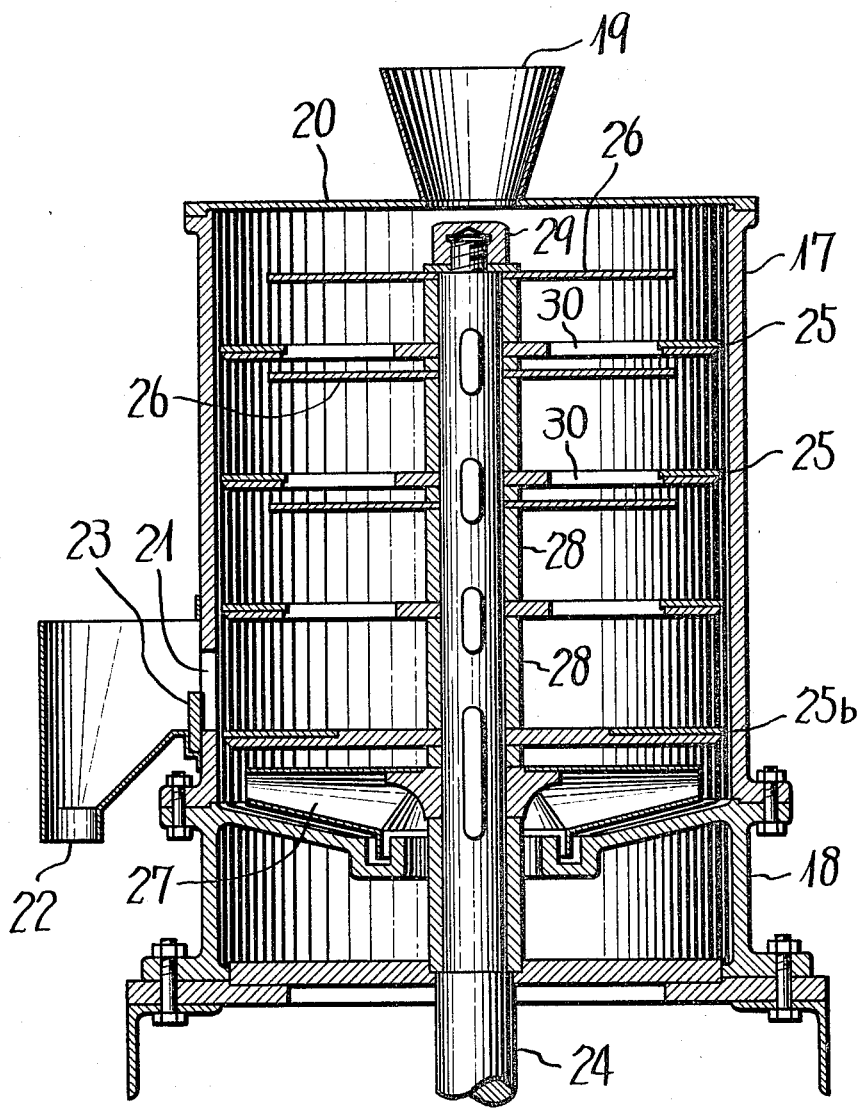

3,277,520
METHOD AND APPARATUS FOR MAKING SPHERICAL GRANULES

Nobuo Nakahara, Matsubara, Osaka, Japan, assignor to Fuji Denki Kogyo Kabushiki Kaisha, Osaka, Japan, a corporation of Japan
Filed June 17, 1964, Ser. No. 375,904
Claims priority, application Japan, June 18, 1963, 38/32,160
2 Claims. (Cl. 18—1)

The present invention relates to a method and apparatus for making granules and particularly to methods and apparatuses available both for making spherical granules directly from wet mixtures of solids in powdered form and liquids, and for transforming wet granules in cylindrical, square and other irregular shapes which are made by granulators, screw type extruders and the like, into spherical granules.

In order to make spherical granules, the so-called "pellets," it has been customary to use rotary drum type pelletizers, rotary pan type pelletizers and so forth.

In these machines, a drum or a pan rotates slowly into which material in powdered form is fed and rolled in accordance with the rotation of the drum or the pan and it is finally agglomerated to spherical granules by the addition of liquids which act as binding agents.

In these cases, granules can be made on a relatively large scale, but strictly speaking, the granules obtained are not spherical and they are different to a large extent in size and not uniform.

Accordingly, in order to obtain uniform size granules, screening process is absolutely required after the granulation or the pelleting.

Thus, it can be said that these methods and apparatuses or machines are not suitable for making spherical granules in uniform size, particularly for making small spherical granules in uniform size on a commercial basis.

In order to make spherical granules, a so-called "pill making machine" has been widely used in the pharmaceutical industry.

The machine can make rather correct spherical granules in uniform size, but it has only small capacity for its motive power and dimensions required and it cannot make small spherical granules having a diameter under 2.0 mm. due to its mechanism.

One of the objects of the present invention is to provide an apparatus for making small spherical granules in uniform size rapidly in batch system.

Another object of the invention is to provide the same apparatus operated in continuous system.

Other objects and advantages of the invention, including novel structural features, will be apparent from the following description when read in connection with the accompanying drawings, in which:

FIG. 3 is a sectional, side elevational view of certain parts shown in FIG. 1, showing how material fluidizes on the indented plate;

FIG. 4 is a plan view in horizontal section taken approximately on the line IV—IV in FIG. 1, showing how the material travels on the indented plate along the inner surface of the wall of the casing;

FIG. 5 is a sectional, side elevational view of a second embodiment of the invention;

FIG. 6 is a plan view showing an example of the indented plates shown in FIG. 5; and FIG. 7 is a sectional, side elevational view taken approximately on the line II—II in FIG. 6.

An embodiment of the invention is illustrated in FIGS. 1, 2, 3 and 4.

Figure 1:
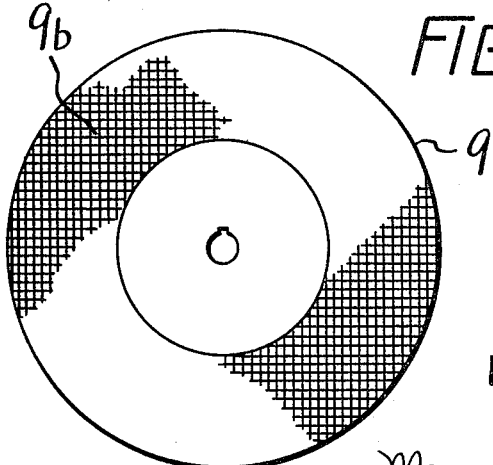
FIG. 1 is a sectional, side elevational view of the apparatus in accordance with the invention.

The apparatus, as shown in FIG. 1, comprises a base or frame 1 which may be supported at a convenient distance above the floor, a flat ring 2, and a vertical casing 3.

A rotor assembly is placed for rotation on a vertical axis in the casing 3 and the rotor assembly is driven by a vertical shaft 4 turning at high speed through a pulley 5 driven by a belt 6 from a separate drive motor, not shown.

The vertical shaft 4 is adapted to rotate within a ball bearing casing 7 which carries a ball bearing 8. The ball bearing 8 serves as the means for supporting the shaft 4.

The rotor assembly comprises an indented plate 9 which is keyed to the shaft 4 and fixed by a nut 10.

The indented plate 9 is positioned horizontally and its peripheral edge rotates adjacently to the inner surface of the wall of the casing 3.

Figure 2:
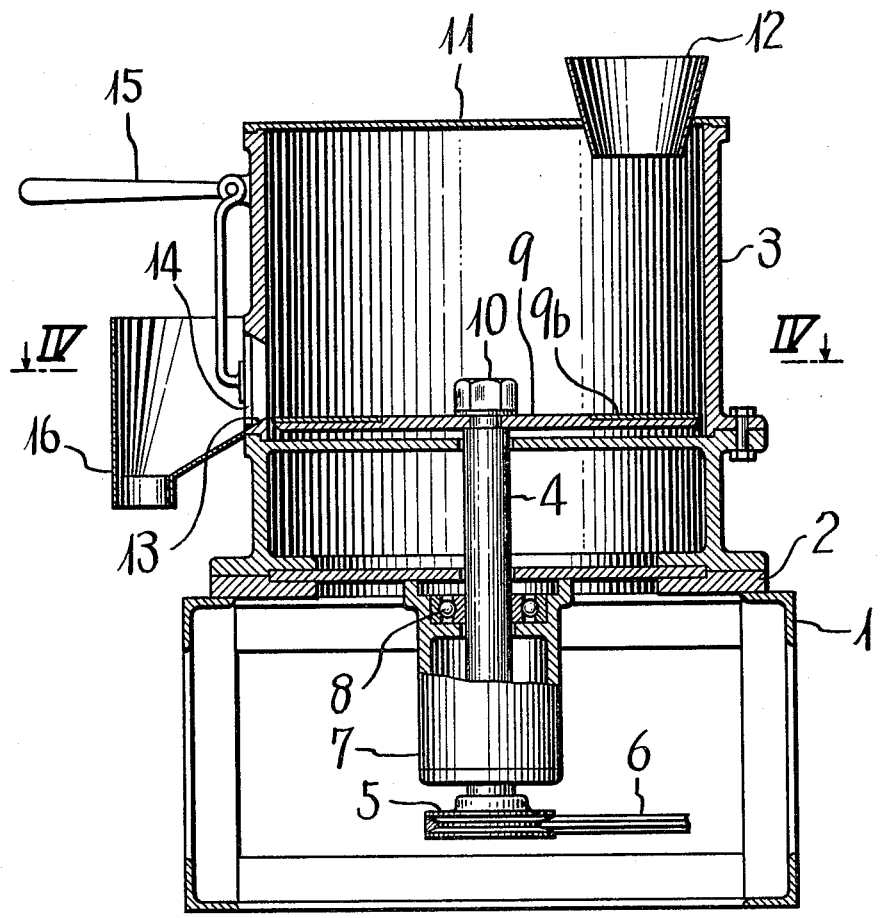
FIG. 2 is a plan view showing an example of an indented plate shown in FIG. 1.

And the indented plate 9 as best seen in FIG. 2 is round, flat and relatively thin, but provided with unevenness 9b on its peripheral upper surface with which material is in contact.

The unevenness 9b, in the present instance, is made by suitable crossing grooves and serves as the means for cutting and rubbing material.

And the unevenness 9b, as shown in FIGURE 4, is attached by some suitable means like a bolt or binder, to the basic plate and it makes complete the indented plate 9.

The vertical casing 3 is shaped to cylindrical form to which a lip 11 is attached, the lip 11 being provided with a hopper 12.

A window 13 for discharge of material is provided on the side in the lower part of the casing 3 and positioned so that its lower edge may be approximately on the same level with the upper surface of the indented plate 9.

A cover 14 for the window 13 is attached to a handle 15 and the cover 14 is closed to the window 13 while treating material, but can be opened outwardly by an operating assembly comprising the handle 15 when material is discharged.

A chute 16 is attached to the side wall of the vertical casing 3 and it serves as the means for collecting discharged material toward a suitable receptacle, not shown.

In operation, material is initially fed by hand, a vibrating feeder and other suitable means through the hopper 12 into the apparatus and then the material falls by gravity on the upper surface of the indented plate 9 which rotates at high speed within the casing 3.

Next, the material on the plate 9, as shown by arrows in FIG. 3, is first thrown out by a centrifugal force caused by the rotation of the plate 9 toward the periphery of the plate 9 and then it goes up along the inner surface of the wall of the casing 3.

And after the material loses the centrifugal force, it falls by gravity toward the center of the plate 9.

In FIG. 4, in accordance with the rotation of the plate 9 turning in the direction as shown by an arrow A, the material travels in the path of arrows B and it eddies along the inner surface of the wall of the casing 3.

Accordingly, if cylindrical granules in random length as material are fed to the apparatus, the granules are first cut to uniform length, and rotated and revolved in the casing 3 by the action of the unevenness 9b on the plate 9 and finally transformed into uniform spherical granules.

In this case, the cylindrical granules must be so made that they have plasticity suitable for being transformed into sphere before the treatment of the apparatus.

In order to make such cylindrical granules, liquids may be added to the material in its granulation.

Further, if the plate 9 has no unevenness 9b on its upper surface, the material cannot be cut or transformed into spherical granules.

Therefore, it can be said that the unevenness 9b serves as an important factor in the present apparatus.

One of the features of the apparatus is that unexpected large mass or granules are not produced because the material on the plate 9 is continuously thrown out radially viewed from the center of the plate 9 by a centrifugal force and each of cylindrical granules can be separated so as not to be agglomerated.

If wet mixtures of solids in powered form and liquids as material are fed to the apparatus, the material is first dispersed radially and outwardly on the plate 9 and then by the same motion caused by the unevenness 9b of the plate 9 as described in detail before, it can be granulated and at the same time the granulated material can be further transformed into spherical granules of uniform size.

When the material is finished to spherical granules, the spherical granules can be discharged from the window 13 designed for the discharge of material by opening the cover 14 operated by the handle 15. The material may then collect in a receptacle, not shown, through the chute 16.

A second embodiment of the apparatus of the invention is illustrated in FIGS. 5, 6 and 7.

In FIG. 5 the apparatus comprises a casing, means for feeding material, means for discharging material and a rotor assembly.

The casing is composed of a vertical case 17 and mounted on a frame 18 which may be supported at a convenient distance above the floor.

The means for feeding material into the apparatus comprises a hopper 19, the hopper 19 being attached to a lip 20 placed at the top of the case 17.

The means for discharging material is composed of a window 21 for discharge of material, the window 21 being positioned on the side in the lower part of the casing 17.

A chute 22 is attached to the window 21 so that the discharged material can be smoothly collected into a suitable receptacle, not shown.

A cover 23 is also attached to the window 21 and so formed that the discharged material may overflow its upper edge.

The rotor comprises a vertical shaft 24, special type indented plates 25, an indented plate 25b, covering plates 26, a fan 27, collars 28 and a nut 29.

The vertical shaft 24 rotates at high speed through a pulley driven by a belt from a separate drive motor, which is not shown, manner of which is similar to the one as shown in FIG. 1.

The special type indented plates 25 are composed of two pieces at least and three pieces in FIG. 5 and keyed to the shaft 24 so that they can rotate with the shaft 24.

Each of the three pieces of the plates 25 is round, flat and relatively thin as shown in FIG. 6 and provided with openings 30.

In the present instance, there are four of the openings 30 of each plate 25, the openings 30 being made to leave arms 33 between the center part 31 and the peripheral part 32 of the plate 25, as best seen in FIG. 6. The peripheral part 32 is provided with an unevenness similar to that at 9b of FIGURE 4 forming cross grooves in plate 25.

And these openings 30 serve as the hole of the droppage of the material.

The arms 33 are shaped to knife edges toward the direction of the rotation of the plate 25, as shown in FIG. 7.

In the present instance, the plate 25 rotates counterclockwise, as shown by an arrow in FIG. 6.

The knife edges are designed not to crush the material which is being granulated when it drops from the openings 30.

Further, an indented plate 25b positioned in the lowest part is similar to the plate 9 in FIG. 2 and provided with no opening so that the material may not drop under the plate 25b. The plate 25b also causes the material to be exhausted smoothly from the discharged material window 21 by the centrifugal force of its rotation as described more fully hereinafter.

The covering plates 26 are composed of two pieces at least in the apparatus.

In the present instance, there are three of these plates 26 as shown in FIG. 5 and each of them is keyed to the shaft 24 so that it can rotate with the shaft 24.

These plates 26 are round, flat and relatively thin and provided with no openings, diameters of which are approximately the same as the outside diameter of the openings 30 of the plate 25.

And these covering plates 26 are positioned over the corresponding plates 25 so that they can cover the openings 30, by which the material is first kept on the peripheral part 32 of the plate 25 and the material does not drop instantly from the openings 30.

The fan 27 is positioned under the lowest indented plate 25b and keyed to the shaft 24, and it rotates with the shaft 24.

This fan 27 is aimed to suck air from the lower part of the apparatus and to blow air up from the clearance between the peripheral edge of the plate 25b and the inner surface of the wall of the case 17 so that the material may not drop under the plate 25b and also not clog the inner surface of the wall of the case 17.

The collars 28 are composed of some pieces suitable for placing the fan 27, the special type indented plates 25, the indented plate 25b and the covering plates 26 at their right positions and all of them are easily detachable from the shaft 24.

The nut 29 is screwed into the top of the shaft 24 and it secures to the shaft 24 the covering plates 26, the special type indented plates 25, the indented plate 25b, and the fan 27 which are each rightly positioned by the collars 28 so that all of them can rotate together in accordance with the rotation of the shaft 24 and also can be easily detached from the shaft 24 by removal of the nut 29 for cleaning of the apparatus.

The operation of the second embodiment is, in principle, similar to that of the first embodiment shown in FIGS. 1, 2, 3 and 4; but it is featured by the fact that the second embodiment can be executed in continuous system, while the operation of the first embodiment is generally executed in batch system.

Accordingly, how the continuous operation is executed is explained hereunder.

If material is fed continuously to the apparatus, the material initially drops on the peripheral part 32 of the plate 25 at top position and begins to be made into spherical granules by the motion of the indented plate 25.

When the material becomes too much to be kept on the periphery 32, it begins to overflow the openings 30 of the plate 25 and drops on the periphery of the second position indented plate 25 by the aid of the next covering plate 26.

On the third plates 25 and 26, the material goes through the same process as above.

But on the fourth indented plate 25b which is located in the lowest part, the material is exhausted to the chute 22 through the window 21 for discharge of material and is finally collected in a receptacle, not shown, by the aid of the centrifugal force caused by the rotation of the plate 25b.

The window 21 is provided with the cover 23 having suitable size to regulate the quantity of the discharged material.

It will thus be seen that the structure and operation of the apparatus and their methods have been fully described, and spherical granules can be made uniformly by the apparatus.

While two preferred embodiments of the invention have been illustrated by way of example in drawings and par-

What is claimed is:

1. A spherical granule making apparatus comprising a vertical cylindrical casing having a hopper for feeding of material at its top and a window for discharge of material on its side in its lower part, a vertical shaft rotating in the casing, a plurality of plates having cross grooves fixed on the vertical shaft of which peripheral edges rotate adjacently to the inner surface of the wall of the casing, each of said plates having arms between a peripheral and center part forming openings for droppage of material, a plurality of covering plates which are round, flat and relatively thin, and positioned so that each of them may cover the openings of the corresponding plate, an indented plate which is positioned horizonally in the lowest part and on the same level with the lower edge of the window for discharge of material, peripheral edge of said indented plate rotating adjacently to the inner surface of the wall of the casing and a fan placed right under the lowest indented plate.

2. A spherical granule making apparatus of claim 1 in which the fan, placed right under the indented plate in the lowest part, feeds air from the lower part of the casing to the upper part of the casing.

References Cited by the Examiner

UNITED STATES PATENTS

| | | | |
|---|---|---|---|
| 1,051,877 | 4/1913 | Gabbett-Fairfax | 209—87 X |
| 1,915,201 | 6/1933 | Ragg | 18—26 X |
| 2,120,540 | 6/1938 | Billings et al. | 23—314 |
| 2,120,541 | 6/1938 | Billings et al. | 23—314 |
| 2,305,172 | 12/1942 | Landgraf | 18—26 X |
| 2,696,019 | 11/1954 | Allan et al. | 18—1 |
| 2,876,491 | 3/1959 | Meyer | 18—1 |
| 2,914,797 | 12/1959 | Cavanagh | 18—1 |
| 2,929,107 | 3/1960 | Andrew | 18—12 X |
| 3,076,547 | 3/1963 | Bodine | 18—1 X |
| 3,103,700 | 9/1963 | Halverson et al. | 18—1 X |
| 3,131,424 | 5/1964 | Ishimitsu et al. | 18—1 |

WILLIAM J. STEPHENSON, *Primary Examiner.*

ROBERT F. WHITE, *Examiner.*

F. WHISENHUNT, *Assistant Examiner.*